United States Patent [19]
Langdon

[11] Patent Number: 5,188,539
[45] Date of Patent: Feb. 23, 1993

[54] QUICK ATTACH/DETACH CONNECTOR
[75] Inventor: Robert S. Langdon, Bedford, N.H.
[73] Assignee: Langdon Enterprises, Inc., Bedford, N.H.
[21] Appl. No.: 857,770
[22] Filed: Mar. 26, 1992

Related U.S. Application Data
[63] Continuation-in-part of Ser. No. 774,585, Oct. 10, 1991, abandoned.
[51] Int. Cl.⁵ .............................................. H01R 4/50
[52] U.S. Cl. .................................... 439/341; 439/338; 439/592; 385/53
[58] Field of Search ............... 439/338, 341, 371, 372, 439/376, 288, 293, 592, 593; 403/122, 353; 385/53, 55, 70

[56] References Cited
U.S. PATENT DOCUMENTS

| | | | |
|---|---|---|---|
| 730,186 | 6/1903 | Case | 403/353 |
| 3,171,704 | 3/1965 | Meile | 439/341 |
| 4,258,940 | 3/1981 | Fudge | 403/353 |
| 4,478,485 | 10/1984 | Khoe et al. | 385/53 |
| 4,679,958 | 7/1987 | Mizusawa et al. | 403/122 |
| 4,796,969 | 1/1989 | Fantone | 385/53 |
| 4,828,353 | 5/1989 | Yamaguchi et al. | 385/70 |

Primary Examiner—Larry I. Schwartz
Assistant Examiner—Hien D. Vu
Attorney, Agent, or Firm—Davis, Bujold & Streck

[57] ABSTRACT

An electrical, fiber optic and/or tube connector having a male connector member and a female connector member. The female connector member has a housing with an opening leading to a generally oval cavity with an electrical, fiber optic and/or tube transmission elements disposed therein. The male connector member has generally oval body portion carrying corresponding electrical and/or fiber optic conductor(s) on an exterior surface thereof. When the generally oval portion of the male connector member is received within the generally oval area of the female connector member, through the opening, and rotated with respect thereto, their respective transmission elements are brought into contact with one another. The oval-shaped configurations of the two members resiliently prevent undesired rotation of one member relative to the other member to maintain their engagement with one another.

24 Claims, 6 Drawing Sheets

QUICK ATTACH/DETACH CONNECTOR

This is a continuation-in-part application of U.S. Pat. Application Ser. No. 07/774,585 filed Oct. 10, 1991, now abandoned.

The present invention relates to an improvement concerning connectors especially connectors used in the medical field and particularly, though not exclusively, to electrical and/or fiber optic connectors.

BACKGROUND OF THE INVENTION

In the medical field there are a variety of known electrical connector devices that are presently in use. One such electrical connector comprises a first electrical member having an exterior thread and a mating second electrical member carrying a component with an internal thread for matingly engaging the external thread of the first electrical member and maintaining the two electrical members in electrical contact with one another once proper engagement therebetween has been achieved. Such electrical connectors are tedious to use and require a surgeon or other health care professional to physically thread the two members together to secure the connection. Moreover, such connections are not always properly obtained on the first try due to misalignment of the two members.

Wherefore, it is an object of the present invention to overcome the drawbacks associated with known prior art connectors.

A further object of the invention is to provide an optic connector which is quickly, easily and repeatedly connected and disconnected while still maintaining good electrical contact/optic contact/sealing connection between the two components while connected.

Another object of the invention is to provide an arrangement which is relatively inexpensive and simple to manufacture.

A still further object of the invention is to provide a mechanism which prevents accidental disconnection of the two connector members once a connection therebetween has been achieved.

These and other objects of the invention will be better understood by those skilled in the art by reference to the accompanying drawings and the following description.

SUMMARY OF THE INVENTION

The present invention provides a connector comprising mating male and female connector members for releasable interconnecting a transmission means supported by each said connector member; said female connector member defining an cavity, of generally oval cross-section, defining a major axis, a minor axis and a longitudinal axis, having an opening thereto remote from said major axis and said longitudinal axis; and said male connector member defining a body portion, of generally oval cross-section, defining a major axis, a minor axis and a longitudinal axis, shaped to intimately fit within said generally oval cavity of said female connector member, the opening being narrower then the dimension of the body portion along its major axis; wherein when said body portion of said male connector member is passed through the opening of the female connector member into said generally oval cavity and rotated so that their major axes are substantially aligned with one another, said male member is resiliently retained by the female member with the contact means of said connector members in engagement with one another thereby forming said interconnection between the transmission means of said two connector members.

BRIEF DESCRIPTION OF THE DRAWINGS

The preferred embodiments of the present invention will now be described, by way of example, with reference being had to the accompanying drawings, in which.

FIG. is a sectional elevation view of an electrical connector according to the present invention.

DESCRIPTION OF THE PREFERRED EMBODIMENTS

Figure 1:
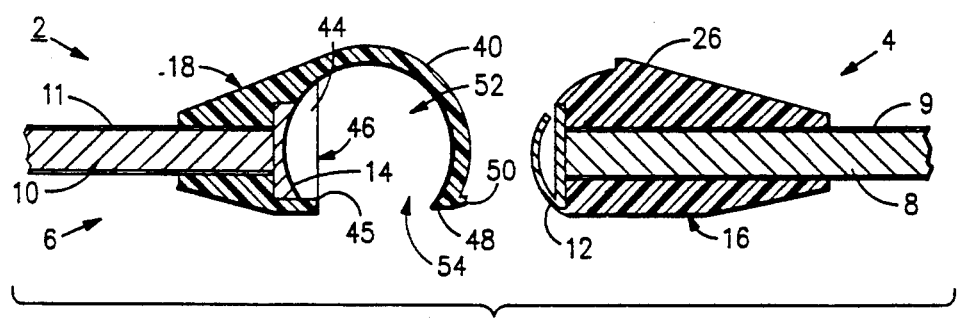
Figure 2:
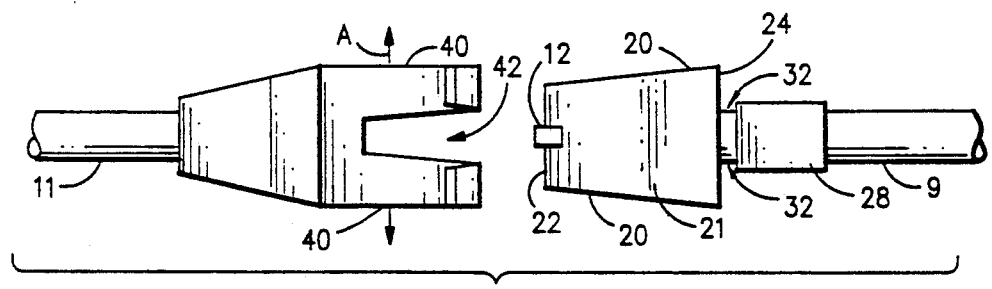
FIG. 2 is an underview of the electrical connector of FIG. 1.
Figure 3:
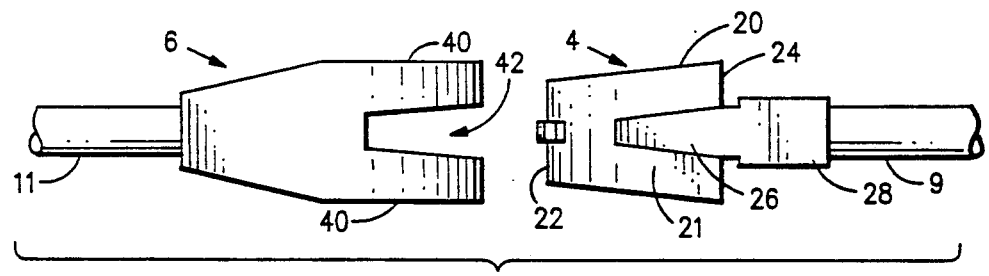
FIG. 3 is a plan view of the electrical connector of FIG. 1.

Turning now to FIGS. 1-3 and 5-8, a preferred embodiment of the present invention will now be described in detail. The electrical connector 2 of the present invention comprises a male connector member 4 and a female connector member 6. The male connector member 4 has a first conductor 8, having an exterior insulating casing 9, extending through an elongate central portion of that member. The first conductor 8 is connected, at one end thereof, to a resilient first electrical contact 12 while the opposite end of the first conductor 8 is connected to a power source, electrical equipment, or the like (not shown).

The female connector member 6 has a second conductor 10, having an exterior insulating casing 11, extending through an elongate central portion of that member. The second conductor 10 is connected, at one end thereof, to a second electrical contact 14 while the opposite end of the second conductor 10 is connected to a power source, electrical equipment, or the like (not shown).

Figure 5:
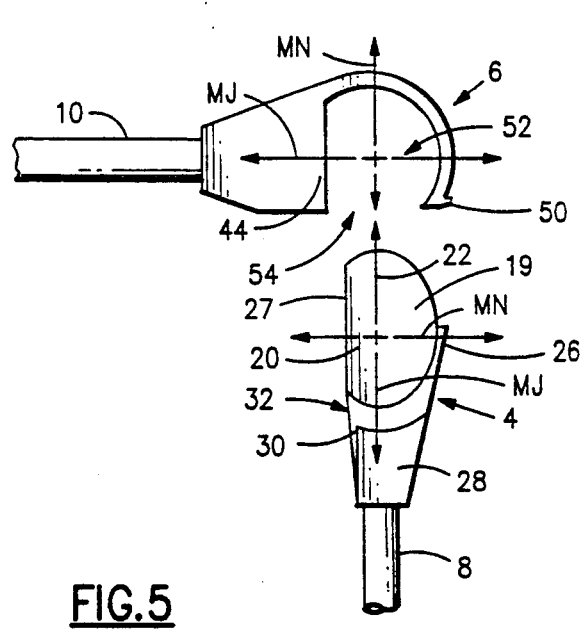
FIGS. 5 through 8 show sequentially the steps required for interconnecting male and female connector members.
Figure 11:
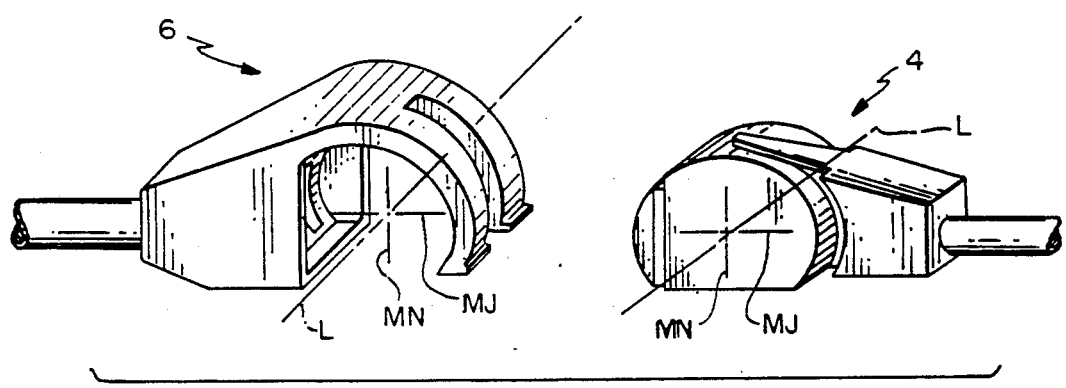
FIG. 11 is a perspective view of the electrical connector, without a seal member, according to the present invention in accordance with the variation of FIG. 10.

The male connection member 4 further includes a main housing 16 comprising an semi-elliptical or semi-oval-shaped portion 19, defining a major axis MJ, a minor axis MN and a longitudinal axis L, having a pair of opposed semi-elliptical or semi-oval-shaped sidewalls 20 (see FIGS. 5 and 11). The pair of semi-oval-shaped sidewalls (20) diverge so as to provide a gradual expansion of the semi-oval-shaped portion 19 along the major axis MJ from a relatively narrow end 22, carrying contact 12, to a relatively wide end 24. A top surface of the main housing 16 is provided with a tapered central alignment ridge or protrusion 26. A lower surface of the main housing 16 is a flat surface 27, the purpose of which will be described hereinafter. A housing extension 28 is provided on the male connection member 4 adjacent the wide end 24 and defines, with the main housing 16, two opposed grooves 32. An abutment edge 30 is positioned adjacent an edge of the housing extension 28 remote from the alignment protrusion 26 but adjacent the wide end 24 of the main housing 16, the purpose of which will also be described hereinafter.

The female housing 18 has a pair of resilient parallel legs 40 each terminating in an end portion 48. Each of the legs 40 has an semi-elliptical or semi-oval-shaped longitudinal shape. A tapered open-ended slot 42 is formed between the two parallel legs 40 for receiving the alignment ridge or protrusion 26. The inner end of the open ended slot 42 acts as a stop for preventing further pivoting movement of the male connector member with respect to the female connector 6. Two opposed sidewalls 44 are provided adjacent the second electrical contact 14 to form a recess 46 for receiving the tapered end 22 of the male connection member 4. The spacing between the two opposed sidewalls 40 is such that the sidewalls 44 will intimately engage a portion of the oval-shaped sidewalls 20 of the male connection member when the tapered end 22 is accommodated within the recess 46. A flat step 45 is formed between the two sidewalls 44 along an edge of the recess 46 remote from the legs 40. The purpose of this flat step will also be described hereinafter. The female housing 18 including the two legs 40 form an interior semi-elliptical or semi-oval shaped cavity 52, defining a major axis MJ, a minor axis MN and a longitudinal axis L, with access to this area being provided by way of an opening 54.

Figure 9:
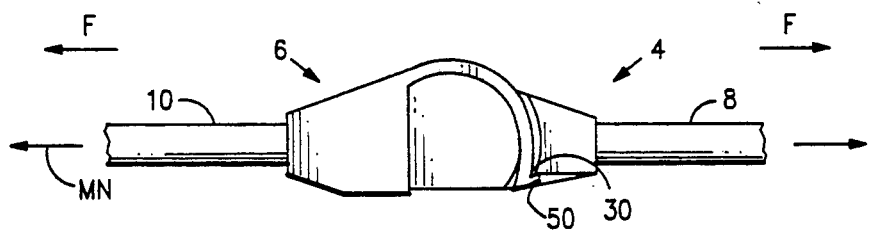
FIG. 9 shows the locking action of the present invention for preventing separation of the two connector members once properly engaged.

At least one of the electrical contacts, preferably the first electrical contact 12 carried by the male connector member 4, is resiliently deformable from an initial position, shown in dashed lines (FIG. 10), upon engagement with the second electrical contact 14. This resilient engagement ensures that an electrical connection between the two contacts 8 and 12 will be maintained even if a force F, tending to disengage the two members, is applied to the electrical connector 2 (FIG. 9).

The opening 54 is about as wide as the dimension of the semi-oval-shaped portion 19 along its minor axis MN so that the legs 40 are biased outwardly slightly upon insertion of the semi-oval-shaped portion 19 into the semi-oval-shaped area 52.

The oval-shaped portion 19 is of substantially the same size and the semi-oval-shaped cavity 52 so that a close intimate engagement between the two members is achieved once they are interconnected. Due to their similar size, the opening 54 is forced open as the portion 19 of the male connection member 14 rotates within the cavity 52 of the female connector device 6 and then returns substantially to its initial position upon completion of the rotation to hold the male connector 4 captive.

Figure 4:
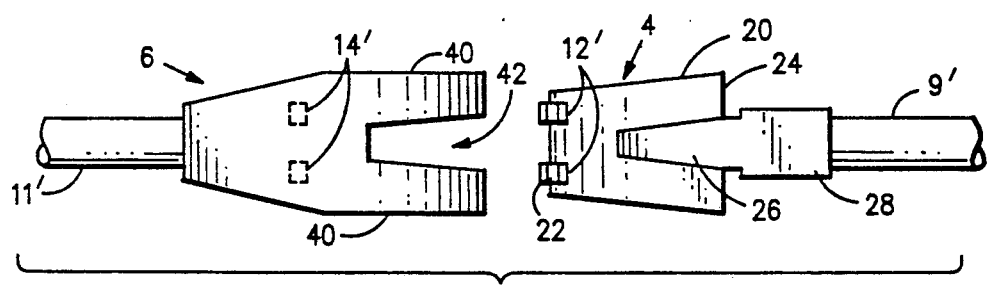
FIG. 4 is a plan view of a second embodiment of the electrical connector of the present invention.

Turning now to FIG. 4, an additional embodiment of the present invention will be briefly discussed. In this embodiment of the invention, two separate conductors, each being individually insulated and contained within the exterior insulated casing 9' and are attached to a separate electrical contact 12', are provided in the male connector member 4 while two electrical conductors, each being individually insulated and contained within the exterior insulated casing 11' and being connected with a separate second contact 14', are provided in the female connector member 6. It will be appreciated that three or more separate insulated conductors, each being contained within the exterior insulated casing and being attached to a separate electrical contact, could be provided in the male connector member 4 and that a similar number of insulated conductors, each being contained within the exterior insulated casing and being connected with a separate second contact, could be provided in the female connector member.

Figure 6:
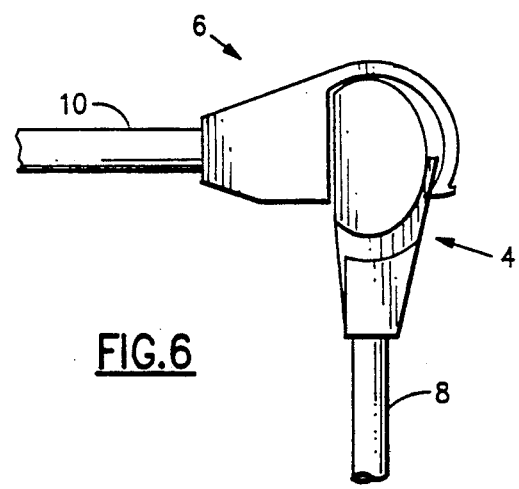
Figure 7:
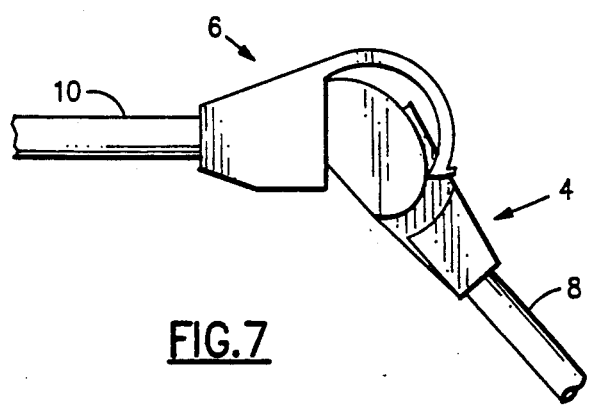
Figure 8:
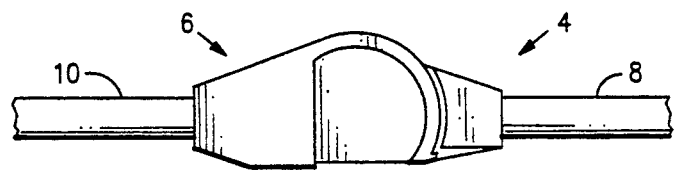

Attachment of the male and female connector members of the present invention will now be described with reference to FIGS. 5-8. The connector members are first disposed at 90° with respect to one another with the tapered end 22 of the male connector 4 located adjacent the opening 54 of the female connector 6, i.e. the major axis MJ of the male connector member 4 being aligned with the minor axis MN of the female connector member 6 (FIG. 5). The male connector member 4 is then moved toward the female connector member 6 and passed through the opening 54, into the semi-oval shaped cavity 52 of the female connector 6 until the tapered end 22 abuts against an inner surface of the legs 40 (FIG. 6). This inserting movement causes the end portions 48 of the legs 40 to be biased outwardly slightly by the exterior surface 21 of the semi-oval-shaped portion 19 as the male connector 4 enters into the semi-oval-shaped cavity 52 of the female connector member 6. After the tapered end 22 abuts against the inner surface of the legs 40, the male connector member 4 is rotated 90 degrees with respect to the female connector member 6 about the longitudinal axis L. During this pivoting movement, an inner surface of the end portions 48 of the legs 40 slide along the smooth exterior surface 21 of the semi-oval portion 19 while the alignment protrusion 26 is guided by the open ended slot 42, between the two legs 40, to ensure proper alignment of the two connector members 4, 6. Once the male connector member 4 has been pivoted approximately 45 degrees with respect to the female connector member 6 (FIG. 7), the end portions 48 of the legs engage and are guided by the grooves 32 to assist further with proper alignment of the two connection members. After the connector members 4, 6 are rotated into the position shown in FIG. 7, the bottom flat surface 27 of the male connector member 4 engages the step 45 of the female connector device 6. Thereafter, the flat surface 27 pivots about the step 45 until the two connector members are completely engaged (FIG. 8). Once complete engagement has occurred, the tapered end 22 of the male connection member 4 is accommodated within the recess 46 and this achieves proper alignment of and communication between the electrical contacts 12, 14. Due to the semi-oval shaped configuration of the semi-oval-shaped portion 19 and semi-oval shaped cavity 52, this engagement resiliently prevents the members from rotating relative to one another from the position shown in FIG. 8 so that the two connection members are maintained in longitudinal alignment with one another until disconnection of the two members is desired.

When properly engaged, the two connection members are prevented from becoming disengaged from one another by the two abutment edges 30 carried by the housing extension 28 of the male connection member 4 and the two abutment flanges 50 carried by the end portions 48 of the legs 40 (FIG. 9). When a disconnecting force F is applied along the major axes MN of the connection device, the legs 40, due to their resilience, will tend to straighten slightly adjacent the end portions 48 so that the abutment flanges 50 are brought into engagement with the abutment edges 30 and this locking mechanism prevents any further disengaging movement of the two connection members while under such tension.

It is important to note that the width of the grooves 32 must be slightly larger that the thickness of the end portions 48 of the legs 40, including flanges 50, so that connection and disconnection can easily occur while still retaining the locking feature of the present invention.

To disconnect the connection members, the male connection member is rotated 90 degrees relative to the female connection member 6, reversing the steps shown in FIGS. 5-8, so that male connection member 4 can thereafter be removed through the opening 54 of the female connection member 6.

Figure 10:
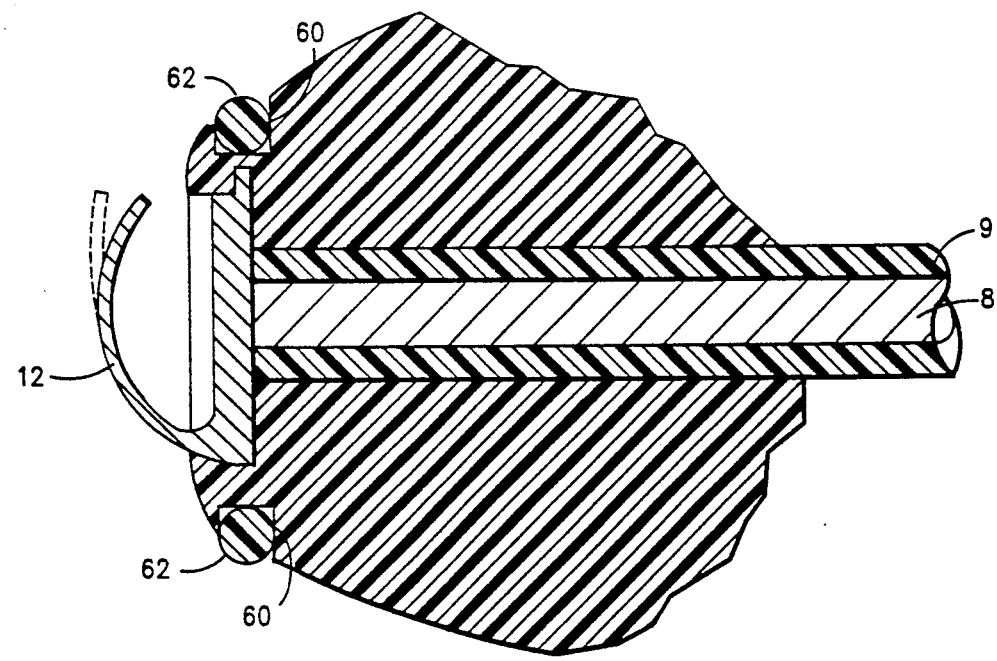
FIG. 10 is a fragmentary sectional elevation of the male connector member illustrated in FIG. 1 showing a variation of the invention for achieving a water tight connection between the two members.

Turning now to FIG. 10, a variation of the first embodiment of the present invention is shown. The only difference is that a continuous peripheral groove 60 is formed in the male connector member 4, adjacent the tapered end 22, spaced from the periphery of the first electrical contact 12. A sealing member 62, such as an elastomeric 0-ring or the like, is accommodated within the peripheral groove 60. The peripheral groove 60 and the seal member 62 combine with the interior surface of the recess 46 to provide a water tight seal between the two connection members 4, 6 once properly engaged. In this embodiment, the outer casing is sealed, by an adhesive or the like, with respect to the housing to prevent water from entering through the gap between those members.

Figure 12:
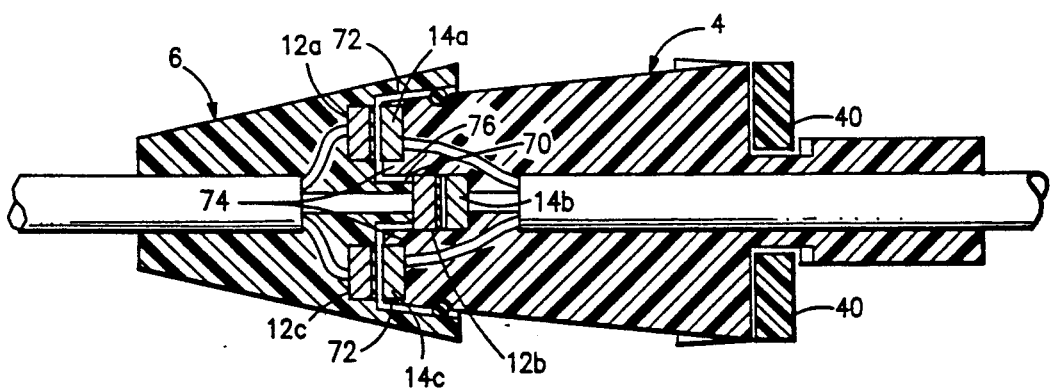
FIG. 12 is a diagrammatic cross-sectional view of the electrical connector according to the present invention illustrating a further variation.

Turning now to FIG. 12, a still further variation of the present invention is shown. This embodiment is useful when high voltage AC power, e.g. 120 volts, is to be passed through the electrical connector, for example when the connector is part of an extension cord. In this embodiment, the female connector member 6 has a central extension 70 which carries a contact 12b connected to the neutral (ground) conductor or wire extending from a power supply. The other two contacts 12a, 12c are recessed into pockets 72 of the housing and are connected to the other two conductors or wires of the power supply for transporting electricity from the power supply to the electrical connector. Due to the recessed contacts 12a, 12c within the pockets 72, the arrangement is useful in preventing electrocution by a user, i.e. preventing the user for accidentally touching both live contacts 12a, 12c of the power source. The male connector member 4 is provided with a mating arrangement, i.e. two outer extensions 74 and a central recess 76, having mating contacts 14a, 14b, 14c and conductors. The engagement of the central extension 70 within the central recess 76 functions to align the two members with respect to one another so that the protrusion 26 and open ended slot 42 arrangement may be eliminated, in this embodiment, if desired.

It is to be appreciated that the contacts 12, 14 can be located by indentations formed in the housing of the connector members.

Figure 13:
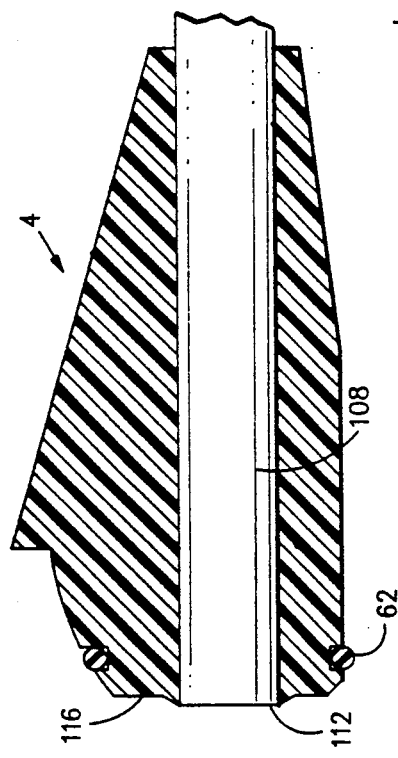
FIG. 13 is a sectional elevation of a fiber optic connector according to the present invention.
Figure 15:
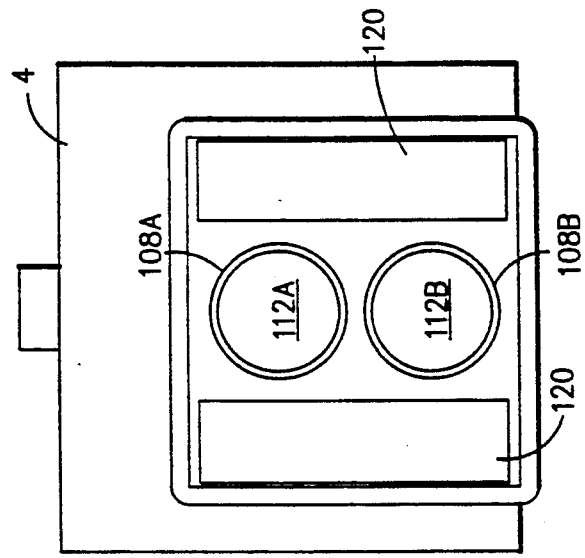
FIGS. 14 and 15 are end elevations of two forms of male connector members, of the connectors of the present invention, combining electrical and fiber optic connections.
Figure 14:
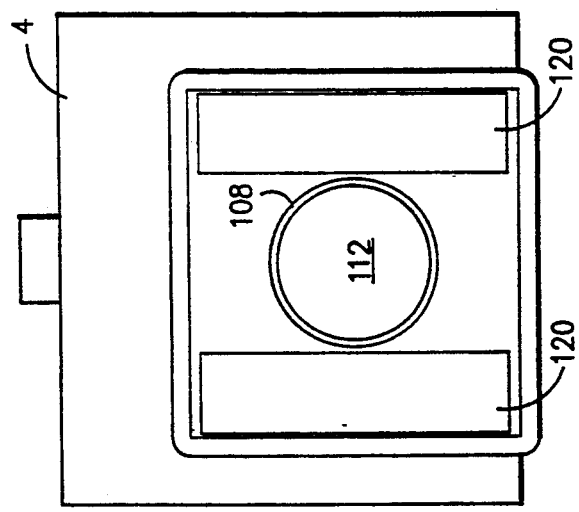

In the description of FIGS. 13, 14 and 15 elements having the general form and function to elements described with reference to FIGS. 1-12 will be given the same reference numbers as used in those FIGURES.

With reference first to FIG. 13 the connector comprises a male connector member 4 and a female connector member 6 both similar in construction and function to those described with reference to 1-3 and 5-8, except for the following changes. In this embodiment electric conductors 8 and 10 are replaced by fiber optic cables 108, 110 terminating within the connector at flat optical light transmission contact faces 112, 114 positioned to interface with one another when the members 4,6 are interconnected as described with reference to FIGS. 5-8. In order to accommodate the fiber optic interface the nose 116 of the male member 4 is flattened with the face 112 of cable 108 projecting just proud of the nose 116. The female member 6 is provided with a flat face 118 with face 114 recessed therein whereby faces 112 and 114 interface for transmission of data fed along the cables 108, 110 when the connector members 4, 6 are attached together.

Sealing arrangements are provided in similar manner to those described with reference to FIG. 10 and the cables 108, 110 are sealingly attached to and pass through members 4, 6 in similar manner to the sealing attachment of the conductors 8, 10 hereinbefore described.

With reference now to FIGS. 14 and 15 two arrangements in which both electrical and fiber optic cables and contacts are accommodated in a single connector of the present invention. In FIG. 14 a fiber optic cable 108 terminates in a face 112 with two electrical contacts 120, to which conductors are attached as described with reference to FIGS. 4 and 10, disposed one on either side of cable 108. Similar and cooperating contacts are provided in the female member 6. FIG. 15 differs only in the provision of two fiber optic cables 108A and 108B, with associated faces 112A and 112B, in place of the single cable 108 of FIG. 14.

Figure 16:
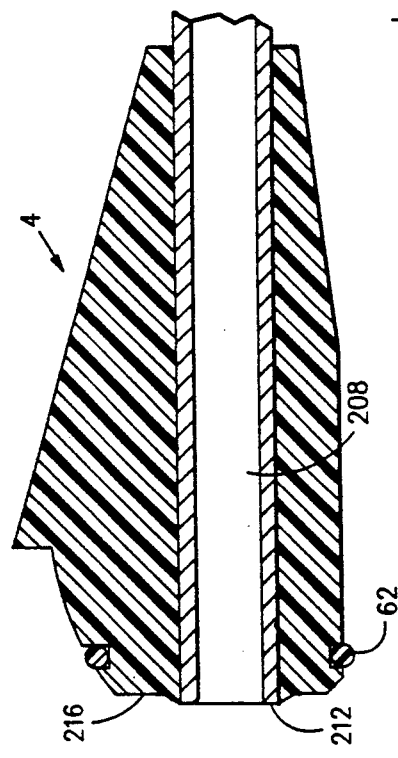
FIG. 16 is a sectional elevation of a connector for interconnecting tubes, for example, vacuum tubes.

In the description of FIG. 16 elements having the general form and function to elements described with reference to FIGS. 1-12 will be given the same reference numbers as used in those FIGURES.

With reference to FIG. 16 the connector comprises a male connector member 4 and a female connector member 6 both similar in construction and function to those described with reference to 1-3 and 5-8, except for the following changes. In this embodiment, conductors 8 and 10 are replaced by tubes 208, 210 terminating within the connector at open ends 212, 214 positioned to communicate with one another when the members 4,6 are interconnected as described with reference to FIGS. 5-8. In order to accommodate tube 216 of the male member 4 may be flattened with the open end 212 of tube 208 flush with or projecting just proud of the nose 216. The female member 6 is provided with a flat face 218 with open end 214 recessed therein whereby faces 212 and 214 communicate when the connector members 4, 6 are attached together. In this embodiment the tubes 208, 210 could terminate within the members 4, 6 with communication between them being by way of passages in the members 4, 6. Also the flat faces 216, 218 could be omitted in this embodiment, as indeed they could in the fiber optic embodiment.

Sealing arrangements are provided in similar manner to those described with reference to FIG. 10 and the tubes 208, 210 are sealingly attached to and pass through members 4, 6 in similar manner to the sealing attachment of the conductors 8, 10 hereinbefore described. The sealing arrangement provides a sealed communication between the tubes 208, 210. In addition to being useful for vacuum (sub-atmospheric pressures) the connection of this embodiment is also suitable for pressurized flows providing leakage past the seal is not exceeded in an unacceptable manner.

Of course electrical and/or fiber optic cables and contacts could be accommodated together with tube(s) in a single connector of the present invention Since certain changes may be made in the above electrical connection device without departing from the spirit and scope of the invention herein involved, it is intended that all matters contained in the above description and/or shown in the accompanying drawings shall be interpreted as illustrating the inventive concept herein involved and shall not be construed as limiting the invention.

I claim:

1. A connector comprising mating male and female connector members for releasably interconnecting transmission means supported by each said connector member;

said female connector member defining a cavity, of generally oval cross-section, defining a major axis, a minor axis and a longitudinal axis, having an opening thereto remote from said major axis and said longitudinal axis, the oval cross-section subtending an angle in excess of 180° about said longitudinal axis; and said male connector member defining a body portion, of generally oval cross-section, defining a major axis, a minor axis and a longitudinal axis, shaped to intimately fit within said generally oval cavity of said female connector member, the opening being narrower than the dimension of the body portion along its major axis;

wherein when said body portion of said male connector member is passed through the opening of the female connector member into said generally oval cavity and rotated so that their major axes are substantially aligned with one another, said male connector member is resiliently retained by the female connector member with said transmission means of said female and male connector members in engagement with one another thereby forming said releasably interconnection between said transmission means of said female and male connector members.

2. A connector according to claim 1, wherein said minor axis of said female connector member passes through said opening.

3. A connector according to claim 1, wherein said opening of said generally oval cavity extends substantially parallel to the major axis and the longitudinal axis of the female connector member.

4. A connector according to claim 1, wherein said generally oval body portion is substantially the same size as said generally oval cavity so that a close intimate engagement therebetween is achieved once their major and minor axes are in alignment with one another.

5. A connector according to claim 1 wherein said transmission means are tubes.

6. A connector according to claim 1, wherein said female connector member comprises a female housing and has a pair of spaced apart legs which, with said female housing, define said generally oval cavity, and said pair of spaced apart legs define therebetween an open ended slot, and an exterior surface of said body portion of said male connector member has an alignment protrusion located to engage said open ended slot when said connector members are rotated with respect to one another to bring their major axes into alignment with one another.

7. A connector according to claim 6, wherein said open ended slot and said alignment protrusion both have similar tapers to provide intimate mating engagement therebetween.

8. A connector according to claim 6, wherein each of said pair of legs has an end portion carrying an abutment flange.

9. A connector according to claim 6, wherein said transmission means of said female connector member is a fiber optic cable terminating in light transmission face which communicates with said generally oval cavity and is located on said major axis of said female connector member remote from said legs.

10. A connector according to claim 9 wherein the generally oval cavity has a flat area surrounding said light transmission face, said light transmission face being an optical light transmissive flat end face of said fiber optic cable parallel to said flat area and recessed in said female connector member.

11. A connector according to claim 9, wherein said female housing further includes a pair of opposed sidewalls located adjacent said light transmission face of said female connector member, and said pair of opposed sidewalls and an inner surface of said generally oval cavity define a recess for receiving a portion of said male connector member.

12. A connector according to claim 11, wherein a step is formed between said two sidewalls along an edge of said recess remote from said legs, and said semi-oval-shaped portion has a flat surface opposite said alignment protrusion, and said flat surface engages and pivots about said step during the rotating movement of said male connector member relative to said female connector member.

13. A connector according to claim 11, wherein said generally oval portion comprises a pair of diverging generally oval sidewalls aligned to provide a gradually expansion from a relatively narrow end to a relatively wide end, said transmission means of said male connector member is a fiber optic cable terminating in a light transmission face located on the major axis of said male connector member adjacent said narrow end, and said narrow end is engagable with said recess.

14. A connector according to claim 13 wherein the generally oval body portion has a flat area surrounding said light transmission face, said light transmission face being an optical light transmissive flat end face of said fiber optic cable of said male connector member parallel to said flat area and outstanding from said male connector member.

15. A connector according to claim 13, wherein said male connector member further includes a housing extension located adjacent said wide end of said generally oval body portion and a pair of grooves extend between said body portion and said housing extension.

16. A connector according to claim 15, wherein a pair of abutment edges are formed adjacent an edge of said housing extension remote from said alignment protrusion and adjacent said wide end of said body portion.

17. A connector according to claim 16, wherein each of said pair of legs has an end portion carrying an abutment flange which, when said male and female connector members are engaged with one another, are brought into engagement with the abutment edges when a separation force is applied along the major axes thereby preventing disengagement of said connector members.

18. A connector according to claim 1, wherein a contact member supported by each of said connector members lies on the major axis of each respective connector member.

19. A connector according to claim 18, wherein said opening is forced wider as said generally oval body portion rotates within said generally oval cavity and said opening returns substantially to its initial size, upon completion of the rotation, so that the female connector member captively holds the male connector member.

20. A connector according to claim 1 wherein at least said transmission means of each connector member is a fiber optic cable terminating in said connector member in an optical light transmissive end face of said optic cable.

21. A connector according to claim 20 wherein at least one said transmission means is an electrical conductor connected to an electrical contact in said connector member.

22. A connector according to claim 1 wherein a seal is disposed between the male and female connector members to hermetically seal the releasable interconnection of said transmission means within the connectors.

23. A connector according to claim 22 wherein said transmission means are tubes.

24. A connector according to claim 23 wherein said transmission means comprise at least one transmission member selected from the group consisting of electrical conductors, fiber optic cables, and tubes.

* * * * *